(12) United States Patent
Samuels et al.

(10) Patent No.: US 7,038,849 B1
(45) Date of Patent: May 2, 2006

(54) COLOR SELECTIVE SCREEN, ENHANCED PERFORMANCE OF PROJECTION DISPLAY SYSTEMS

(75) Inventors: Brian Samuels, Fremont, CA (US); Nathan Moroney, Palo Alto, CA (US); Xiao-An Zhang, Sunnyvale, CA (US); Zhang-Lin Zhou, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 10/282,818

(22) Filed: Oct. 28, 2002

(51) Int. Cl.
  G03B 21/56 (2006.01)
  G03B 21/60 (2006.01)
  G02B 13/20 (2006.01)
  G02B 27/00 (2006.01)

(52) U.S. Cl. .............. 359/443; 359/450; 359/453; 359/454; 359/456; 359/459; 359/460; 359/599; 359/601; 359/613; 359/614; 359/615; 359/893

(58) Field of Classification Search ............ 359/443, 359/450, 453–454, 456, 459, 460, 599, 601, 359/613, 614–615, 893
See application file for complete search history.

(56) References Cited

U.S. PATENT DOCUMENTS

| 5,111,337 | A | * | 5/1992 | Martinez | 359/443 |
| 5,148,309 | A | * | 9/1992 | Yamada et al. | 359/443 |
| 5,153,481 | A | * | 10/1992 | Matsuda et al. | 313/479 |
| 5,521,759 | A | * | 5/1996 | Dobrowolski et al. | 359/585 |
| 5,523,649 | A | * | 6/1996 | Tong et al. | 313/479 |
| 5,621,487 | A | * | 4/1997 | Shirochi | 349/112 |
| 5,715,083 | A | | 2/1998 | Takayama | 359/443 |
| 6,095,652 | A | | 8/2000 | Trayner et al. | 353/10 |
| 6,144,491 | A | * | 11/2000 | Orikasa et al. | 359/452 |
| 6,404,548 | B1 | * | 6/2002 | Tatsuki et al. | 359/449 |
| 6,449,089 | B1 | * | 9/2002 | Moshrefzadeh et al. | 359/454 |

FOREIGN PATENT DOCUMENTS

| DE | 29813364 U | 10/1998 |
| JP | 63-128289 | 12/1989 |

* cited by examiner

Primary Examiner—David Gray
Assistant Examiner—Magda Cruz

(57) ABSTRACT

Optical properties of a screen on which an image is being projected are considered. A patterned surface is given a predetermined pattern of color pixels whereby a degree of wavelength selectivity is employed to improve the color qualities of the projected image. A system is provided wherein there is a matching of emission characteristics of a projector to the screen's reflective characteristics.

23 Claims, 8 Drawing Sheets

(1 of 8 Drawing Sheet(s) Filed in Color)

(RELATED ART)

COLOR SELECTIVE SCREEN, ENHANCED PERFORMANCE OF PROJECTION DISPLAY SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO AN APPENDIX

Not applicable.

BACKGROUND

1. Technical Field

The invention relates generally to display projection system.

2. Description of Related Art

Projection systems of both front projection, reflective viewing, and rear projection, transmissive viewing, are known in the art. A common problem in projection systems is that ambient lighting conditions reduce contrast and degrade viewing image quality.

Typical projection technology focuses on hardware and electrical design of the projector to improve the color image quality of the projected image. A typical projector uses red, green and blue ("RGB") filters in combination with a light source additively to create a range, or gamut, of possible colors. Considerable constraints exist for the selection of these filters, such as wavelength of peak absorption, spectrum bandpass, cost, durability, and the like factors known to those skilled in the art. Moreover, the screen is typically a mostly spectrally non-selective material that appears white or silver and may be retroreflective.

BRIEF SUMMARY

The invention generally provides for a spectrally selective projection screen and projection system.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference designations represent like features throughout the drawings. The drawings in this specification should be understood as not being drawn to scale unless specifically annotated as such.

DETAILED DESCRIPTION

The present inventive concept develops optical properties of the screen on which the image is being projected. Wavelength selectivity is employed to improve the color qualities of the projected image.

Figures 1, 1A:
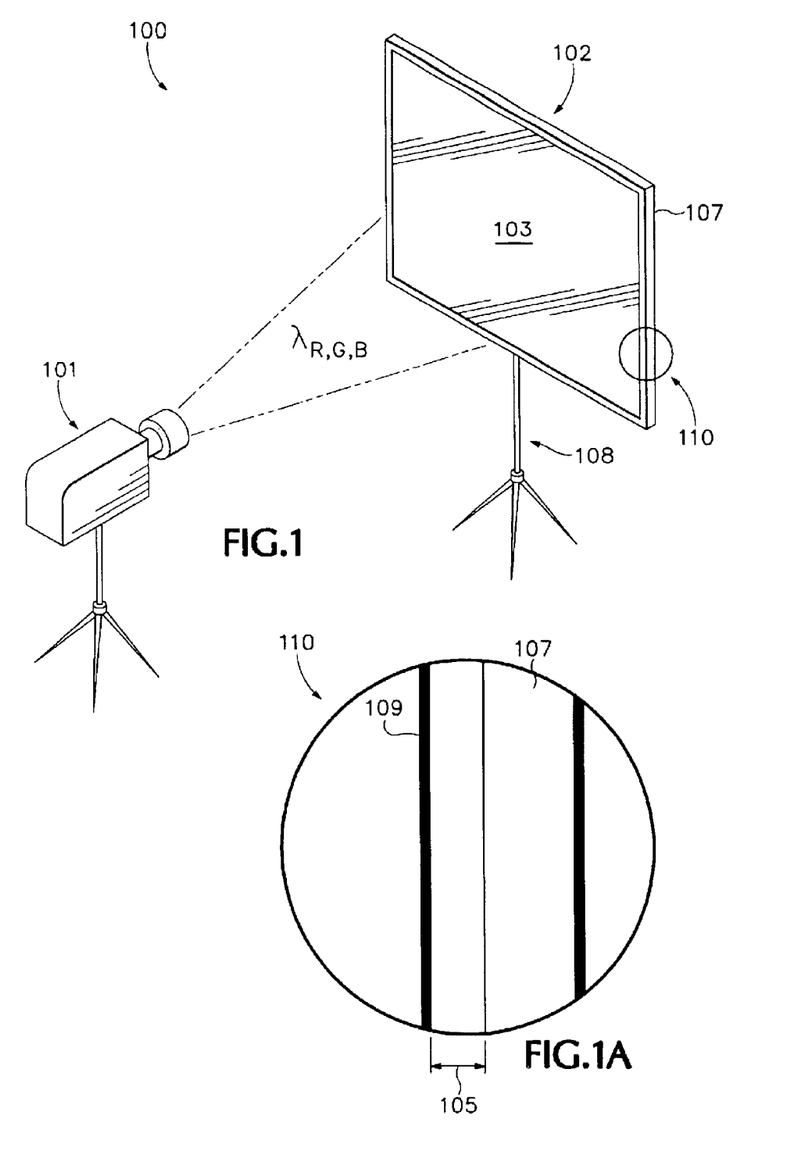
FIG. 1 in accordance with a first exemplary embodiment of the present invention is a schematic depiction of a front projection system illustrating a screen with a viewing region having spectrally selective properties.
FIG. 1A is a detail region of FIG. 1.

FIG. 1 is a perspective view, schematic illustration, showing a reflecting screen projection system 100. FIG. 1A is a magnified detail 110 of the reflective projection screen 102 of the system 100 as shown in FIG. 1.

Image and information projection apparatus, generically referred to as a "projector," 101 are well known in the art. An exemplary red-green-blue, "RGB," color projector 101 provides a projection, represented by a schematic, phantom-line, "beam regions" labeled $\lambda_{R,G,B}$ onto a viewing screen 102 having a viewing surface region 103. The screen 102 has a support, or frame, 107 and a stand 108.

Looking also to FIG. 1A, the viewing surface region 103 includes a substrate 105 and a surface coating 109. The substrate 105 can be any material that will accept the coating 109. Preferably, the substrate 105 is a flexible material since most reflective projection screens 102 are preferred to be of the well-known roll-up style (not shown).

The coating 109 of this exemplary embodiment is a mosaic of red, green and blue pixels which may include superpixels, where a "superpixel" is a contiguous group of more than one like-colored individual pixel at a given resolution. Sample mosaics 301, 401, 501, 601 are shown respectively in FIGS. 3, 4, 5 and 6, described in more detail hereinafter. Individual pixels are shown as squares of color and superpixels are shown as rectangular geometric constructs; it should be recognized that no limitation on the scope of the invention is intended by these exemplary square pixels and constructs nor should any be implied as it will be understood by those skilled in the art that other geometric shapes may be employed. Specifically, patterns can be developed for both the additive primary colors (red, green, blue), the subtractive primary colors (cyan, magenta, yellow), combinations, or other color systems. The color pixels and superpixels of a mosaic 301–601 patterned coating 109 may be formed in any known manner; e.g., inkjet printing, silk-screening printing, or the like.

In the exemplary embodiments shown, the color mosaic pattern types were printed to resemble a frequency-modulated halftoning pattern or white noise that has been low-pass filtered. Other pattern types may be used, but a frequency-modulated halftoning screen or white noise types are preferred in that they minimize structure visibility. Moreover, a frequency-modulated halftoning screen or white noise type allows an equal amount of red, green and blue pixels in the total resolution count, i.e., a 1:1:1 ratio of RGB. Note that it is envisioned that a different balance to the relative numbers of red, green and blue may be used to achieve a specific reflective or, in rear projection, transmissive, color shift or enhancement; each such unbalanced exemplary mosaic pattern of FIGS. 4, 5 and 6 and its purpose is described hereinafter.

Figure 7:
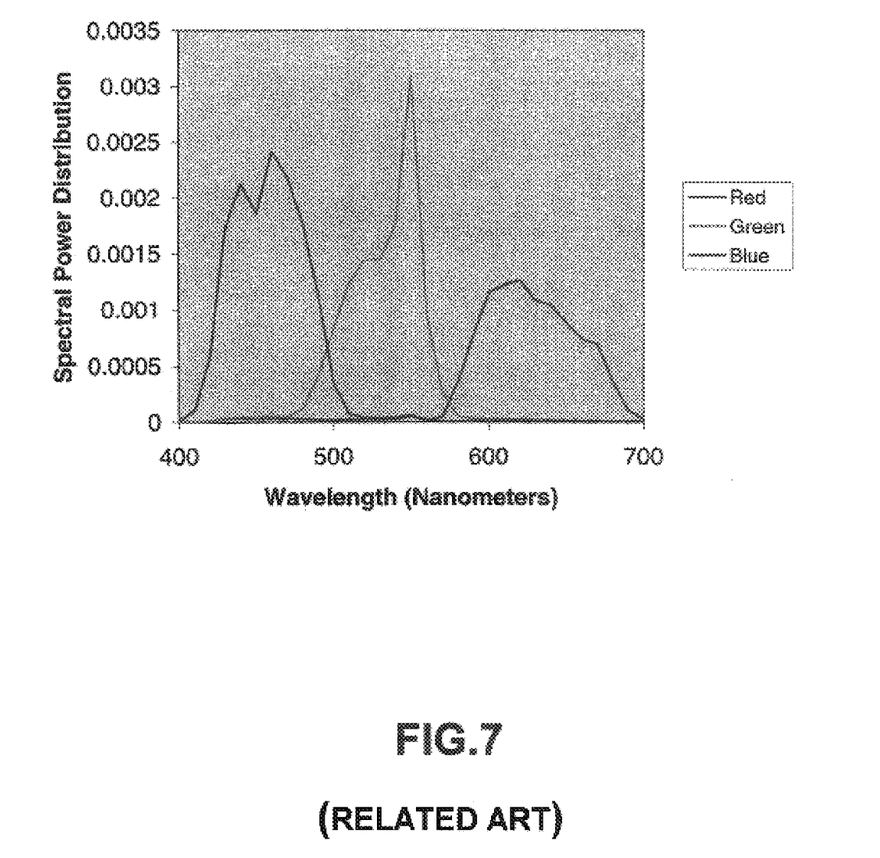
FIG. 7 is a spectral power distribution for RGB primaries of a given projector measured by a given spectroradiometer.

FIG. 7 shows a spectral power distribution as measured using a PhotoResearch company, model PR 650, spectroradiometer for the red, green and blue primaries of an Epson™ PowerLite 5000™ projector used in experimental procedures for development of the present invention. The x-axis of FIG. 7 is wavelength in nanometers ("nm") and the y-axis is the relative power of each primary spectrum.

Figure 3:
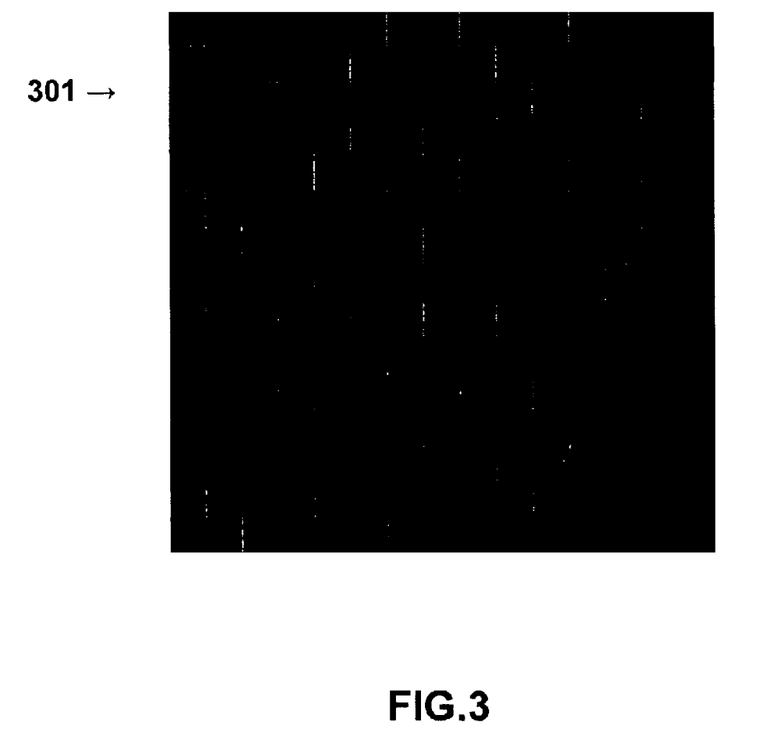
FIG. 3 is a color drawing representing a first embodiment of a relatively small segment of a pattern for a surface mosaic for enhancing screen chromaticity of the viewing region shown in FIGS. 1, 1A, 2 and 2A.

Looking now in more detail at FIG. 3 in conjunction with FIGS. 1 and 1A, an enlargement of a portion of the printed red, green and blue patterned mosaic 301 used for the coating 109 of the screen viewing region 103 is shown. In an experimental exemplary embodiment, this mosaic 301 was repeated, or tiled, to a size of roughly 38 cm$^2$ such that each individual pixel square is approximately 0.5 mm$^2$. To the naked eye, the printed simulation appears to be a dark gray with a texture that is difficult to resolve at viewing distances of greater than one meter.

Figure 8:
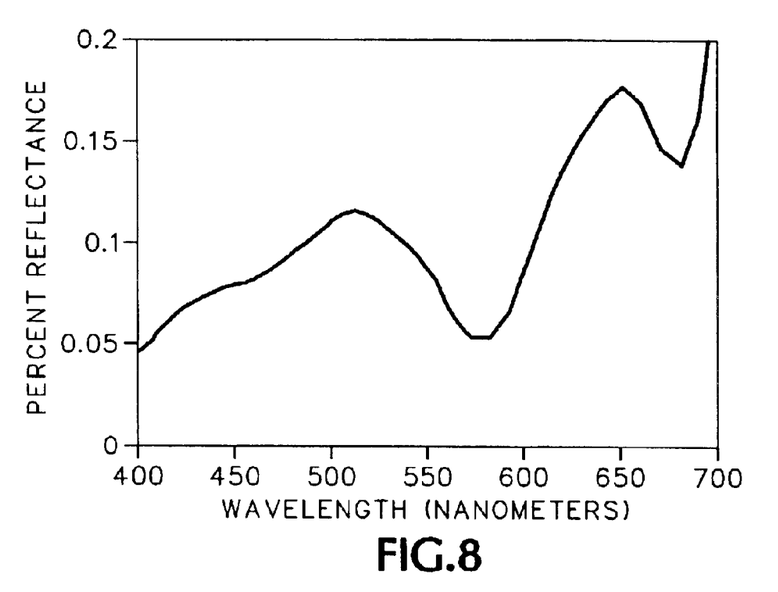
FIG. 8 is a reflectance curve of the RGB mosaic shown in FIG. 3 made using the spectroradiometer described with respect to FIG. 7.

FIG. 8 shows a reflectance curve for a printed RGB mosaic coated screen using the pattern as shown in FIG. 3, illuminated by the given Epson projector without any intermediary slide or the like image, viz., the "white" light emission; the measurement tool was a Gretag Spectrolino™ spectrophotometer. The x-axis is wavelength in nanometers while the y-axis is the percent reflectance.

Figure 9:
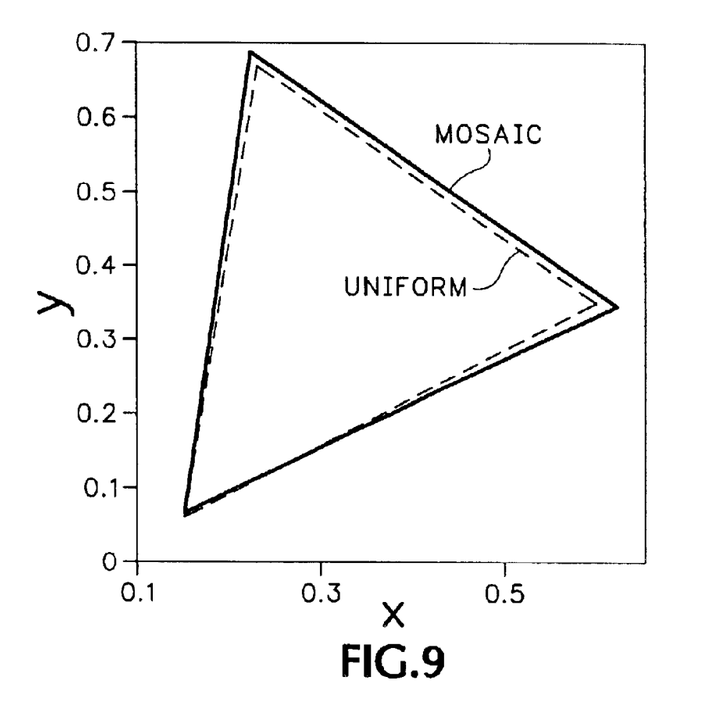
FIG. 9 is a comparison chart, using CIE standard characteristics of chroma measurement, of projection on a white screen versus projection on a mosaic screen using the RGB mosaic shown in FIG. 3.

Ideally, the goal is have a screen coating having a mosaic which will provide a spectral reflectance curve with roughly three maxima, or peaks, centered at roughly the same peak emission wavelengths of the given projector. In this experiment, as shown by FIG. 7, the peaks for the given Epson projector are roughly 450 nm for blue, 550 for green and 620 for red. Note in FIG. 8 there is a significant minima, or valley, around 575 nm, in the green wavelength gamut. It has been found that red and blue light reflectance is enhanced using the pattern of FIG. 3. In other words, the chromaticity measured for reflected red and blue primaries is increased. This was confirmed as shown in FIG. 9, a comparison of display primaries in a x-y CIE chromaticity diagram; measurements from a uniform white screen are shown in dashed--line and measurements from a screen having the pattern as shown in FIG. 3 are shown in a solid-line. The axes are CIE 1931 standard chromaticity x and y values, wherein the larger the area spanned by the primaries, the bigger the gamut. It can be seen that the red and green primaries shown to the upper left and to the right are shifted outward. This shift corresponds to a roughly ten-percent increase in the chroma for the red and green primaries. These results were achieved with only a negligible shift in apparent contrast range, roughly 35:1 for the uniform white screen versus 31:1 for the mosaic-patterned screen.

It may be noted that the wavelengths for optimization of the screen are generally specific to the human visual system. Additive primaries of roughly 450, 540, and 605 nanometers have a high degree of visual efficiency and result in larger display gamuts. Such optimum wavelength characteristics can be used as a design guide for a wavelength selective screen for a particular implementation.

Figure 4:
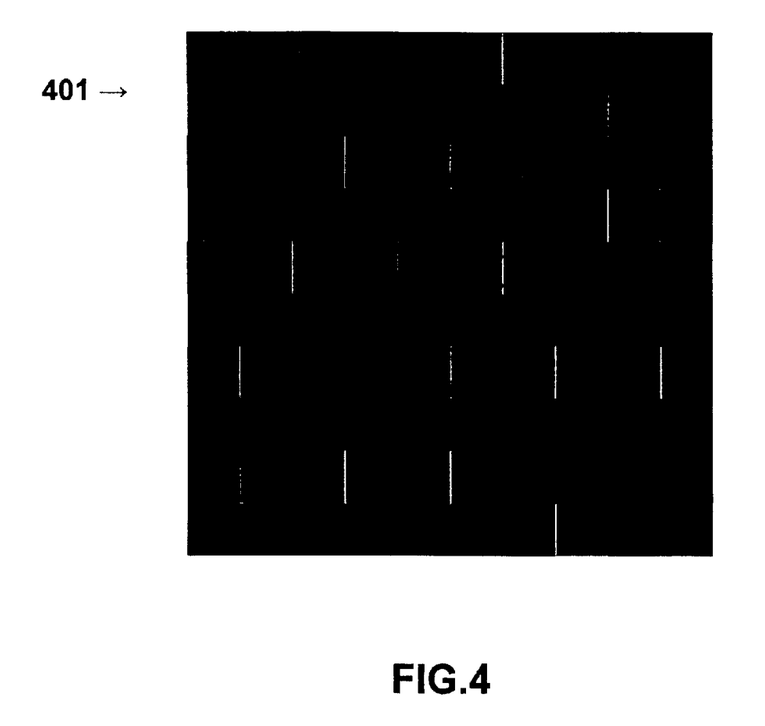
FIG. 4 is a color drawing representing a second embodiment of a relatively small segment of a pattern for a surface mosaic having for improving red chromaticity of the viewing region shown in FIGS. 1, 1A, 2 and 2A.

The mosaic 401 of FIG. 4 is an example of a pattern balance other than 1:1:1 which incorporates an increase in the number of red pixels and superpixels. Thus, it should be suited for a projection system 100 in which the given projector 101 has a relatively weak red wavelength gamut peak emission characteristic.

Figure 5:
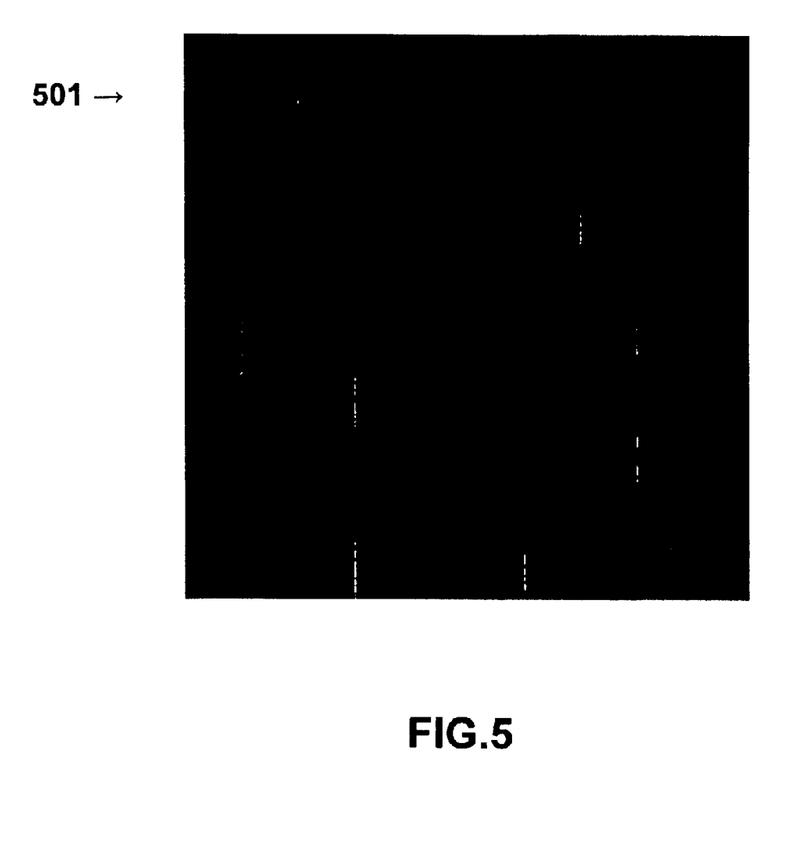
FIG. 5 is a color drawing representing a third embodiment of a relatively small segment of a pattern for a surface mosaic for improving green chromaticity of the viewing region shown in FIGS. 1, 1A, 2 and 2A.

The mosaic 501 of FIG. 5 is an example of a pattern balance which incorporates an increase in the number of green pixels and superpixels. Thus, it should be suited for a projection system 100 in which the given projector 101 has a relatively weak green wavelength gamut peak emission characteristic.

Figure 6:
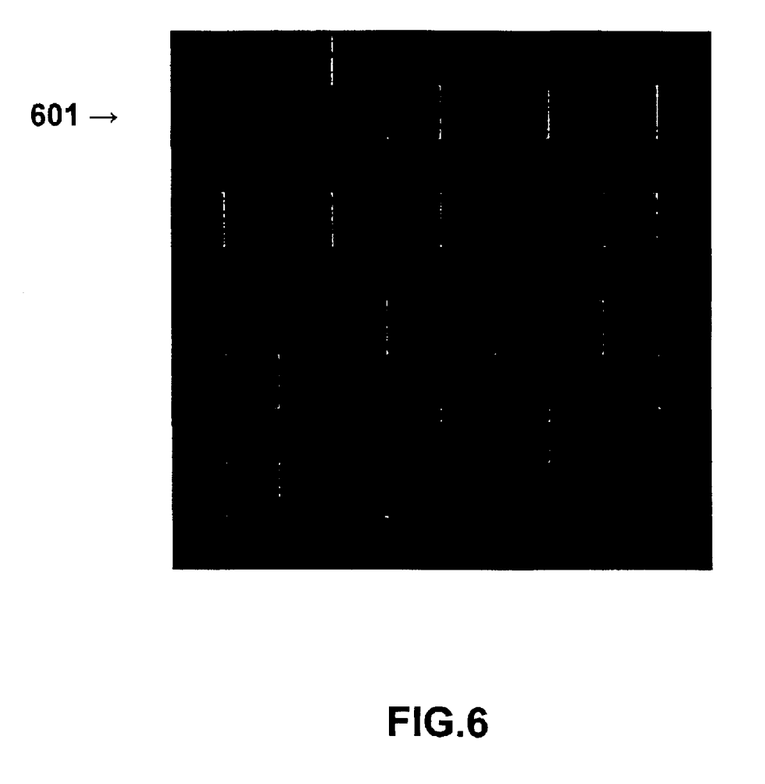
FIG. 6 is a color drawing representing a fourth embodiment of a relatively small segment of a pattern for a surface mosaic for improving blue chromaticity of the viewing region shown in FIGS. 1, 1A, 2 and 2A.

The mosaic 601 of FIG. 6 is an example of a pattern balance which incorporates an increase in the number of blue pixels and superpixels. Thus, it should be suited for a projection system 100 in which the given projector 101 has a relatively weak blue wavelength gamut peak emission characteristic.

The basic idea of tailoring a screen coating 109 to match the emission characteristics of a given projector 101 can be extended to providing a mosaic pattern where the relative amount of two primaries at the same time is employed.

Figure 2:
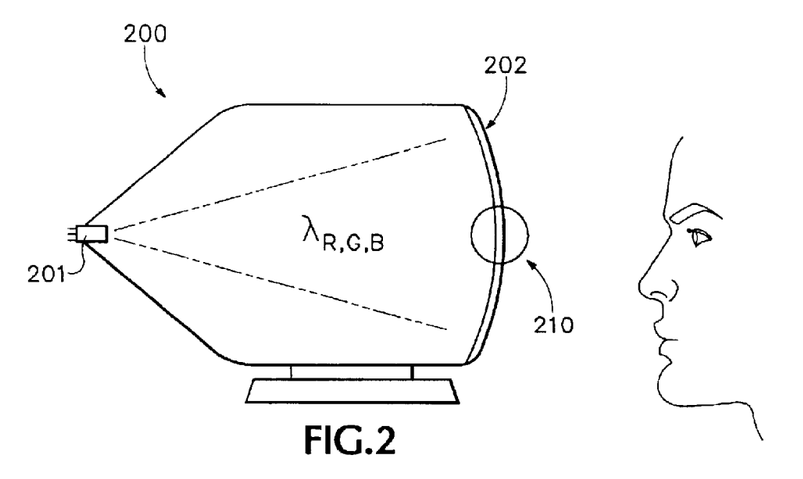
FIG. 2 in accordance with a second exemplary embodiment of the present invention is a schematic depiction of a rear projection system illustrating a screen with a viewing region having spectrally selective properties.
Figure 2A:
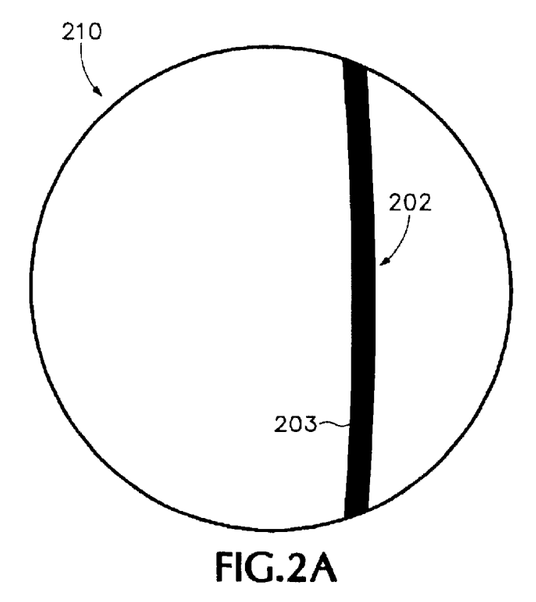
FIG. 2A is a detail region of FIG. 2.

FIG. 2 shows an alternative embodiment for a rear projection system 200. The viewing screen FIG. 2A illustrates detail 210 for FIG. 2 analogous to FIG. 1A and FIG. 1. The system 200 employs an RGB gun 201 as would be known in the art, projecting a light beam, again represented schematically by the region labeled $\lambda_{R,G,B}$. The inner surface 203 of the screen 202, generally of glass or plastic, which will display a projected image is provided with a coating having a pixilated translucent mosaic such as exemplified by FIGS. 3, 4, 5, and 6 to match the emissive characteristics of the gun 201.

In another embodiment, rather than using a coating 109 for the mosaic of colored pixels, or superpixels. Active devices that would have their reflective or transmissive properties switched (such as photodiodes, or the like as known in the art of active screen displays) may be employed. Again, using the sample mosaics 301, 401, 501, 601 as shown respectively in FIGS. 3, 4, 5 and 6, each color region represents one or more such devices. Note that these examples should not be interpreted as a limitation on the scope of the invention; many other colors, fluorescent pigments, and the like as would be known in the art may be implemented.

It should be recognized that the present invention not only enhances the imaging performance of existing projectors, but in addition permits the designer of the projector an additional degree of freedom. For example, one can optimize the spectral reflectivity of the screen to enhance the projected image performance of a given projector by reducing reflected ambient light, enhancing the reflection of specific spectral regions to accommodate the properties of the projected light (i.e. make up for weak red output of a projector), or both.

As another example, one can optimize the projected spectrum of the projector to the spectral reflectivity of the screen.

As yet another example, one can optimize the projected spectrum of the projector and the spectral reflectivity of the screen together to maximize the overall improvement in image properties and potentially reduce the cost of the projector—through a reduction of ambient light and enhanced reflectivity of specific spectral regions that improve the image performance—such as increasing the reflectivity of red light over green and blue. Optimizing both together is likely to produce the best overall results for cost and performance.

Yet another exemplary option is to make a generic screen that improves performance for most existing projectors. This would be much like the neutral gray screens presently available for home projection systems but this one would uses designed spectral reflectivity to improve it's performance.

A further exemplary option is to fabricate electrically active planer layer, striped or pixelated screens; screens that are not active at the pixel level like the current LCD monitors where every single pixel is independently switched but rather whole layers, or sets of stripes or sets of pixels that are switched in concert with the projected light hitting the screen.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A display screen comprising:

a substrate; and on the substrate, at least one coating for rendering the screen selectively reflective with respect to selected wavelengths of light projected thereon or therethrough and for reducing reflected ambient light and reflected undesired projected light therefrom, said coating comprising a predetermined pattern of primary color pixels, superpixels, or both where a superpixel is a contiguous group of more than one like-colored individual pixel at a given resolution.

2. The screen as set forth in claim 1 comprising:

said coating enhances black and white contrast, at least one predetermined peak wavelength reflectance characteristic, or both.

3. The screen as set forth in claim 1 comprising:

one or more layers of said coating completely covering a viewing area of said substrate.

4. The screen as set forth in claim 1 wherein said predetermined pattern comprises:

a mosaic pattern associated with enhancement of at least one predetermined peak wavelength reflectance characteristic.

5. The display screen as set forth in claim 1 comprising:

the color mosaic pattern simulates a frequency-modulated halftoning screen.

6. The display screen as set forth in claim 1 comprising:

the color mosaic pattern simulates white noise that has been low-pass filtered.

7. The display screen as set forth in claim 1 comprising:

the color mosaic pattern total resolution count contains an equal number of individual primary color pixels.

8. The display screen as set forth in claim 1 comprising:

the color mosaic pattern total resolution count contains an unequal number of primary color pixels.

9. The display screen as set forth in claim 1 wherein said pattern includes repeating units of pixels and superpixels.

10. The screen as set forth in claim 1 wherein said coating comprises:

one or more layers of a colorant forming a mosaic pattern or a striped pattern covering a viewing area of the screen at least once.

11. A coating for a viewing screen substrate, the coating comprising:

at least one layer of material having a pattern of pixels and superpixels wherein each pixel is a primary color and superpixels are conglomerates of like-colored pixels; and said pattern of pixels and superpixels has a geometric configuration wherein a degree of wavelength selectivity is employed for improving color qualities of a projection onto said pattern.

12. A projection system comprising:

a projector; and a display screen having a viewing area, said viewing area including a reflecting surface having a pattern subsystem for rendering the screen selectively reflective with respect to light projected thereon or therethrough and for reducing reflected ambient light and reflected undesired projected light therefrom, said subsystem comprising a predetermined pattern of primary color pixels, superpixels, or both where a superpixel is a contiguous group of more than one like-colored individual pixel at a given resolution.

13. The system as set forth in claim 12, said subsystem comprising:
- a coating which enhances black and white contrast, at least one predetermined peak wavelength reflectance characteristic, or both.

14. The system as set forth in claim 13 comprising:
- one or more layers of said coating completely covering a viewing area of said substrate.

15. The system as set forth in claim 2 wherein said predetermined pattern comprises:
- a mosaic pattern associated with enhancement of at least one predetermined peak wavelength reflectance characteristic.

16. The system as set forth in claim 12 comprising:
- the color mosaic pattern simulates a frequency-modulated halftoning screen.

17. The system as set forth in claim 12 comprising:
- the color mosaic pattern simulates white noise that has been low-pass filtered.

18. The system as set forth in claim 12 comprising:
- the color mosaic pattern total resolution count contains an equal number of individual primary color pixels.

19. The system as set forth in claim 12 comprising:
- the color mosaic pattern total resolution count contains an unequal number of primary color pixels.

20. The system as set forth in claim 12 wherein said pattern includes repeating units of pixels and superpixels.

21. A method for enhancing a projection, the method comprising:

- emitting the projection using primary color projected light having a spectral power distribution characterized by an approximate maxima for each color; and

- receiving the projection on a surface having a plurality of primary color pixels wherein said pixels are in a pattern for creating a reflectance characteristic substantially matching said distribution.

22. A method for enhancing a projection, the method comprising:

- emitting the projection using primary color projected light having a given spectral power distribution characterized by a function representative of the wavelength gamut for each primary color; and

- receiving the projection on a surface having a plurality of pixels and superpixels, wherein said superpixels are contiguous pixels of a like primary color, and wherein said pixels and said superpixels are arranged in a reflectance pattern for selectively enhancing the projection in a predetermined relationship to said function.

23. A display screen comprising:

a mounting; and connected to said mounting, an area of active devices having a predetermined array pattern for rendering the screen selectively reflective with respect to light projected thereon or therethrough and for reducing reflected ambient light and reflected undesired projected light therefrom, wherein said predetermined pattern comprises a mosaic pattern associated with enhancement of at least one predetermined peak wavelength reflectance characteristic.

* * * * *

UNITED STATES PATENT AND TRADEMARK OFFICE
CERTIFICATE OF CORRECTION

| | |
|---|---|
| PATENT NO. | : 7,038,849 B1 |
| APPLICATION NO. | : 10/282818 |
| DATED | : May 2, 2006 |
| INVENTOR(S) | : Brian Samuels et al. |

Page 1 of 1

It is certified that error appears in the above-identified patent and that said Letters Patent is hereby corrected as shown below:

In column 2, line 50, delete "regions" and insert -- region --, therefor.

Signed and Sealed this

Sixth Day of April, 2010

David J. Kappos
*Director of the United States Patent and Trademark Office*